United States Patent [19]

Everts

[11] Patent Number: 4,651,422
[45] Date of Patent: Mar. 24, 1987

[54] LINE GUARD FOR A LINE CUTTING TYPE WEED TRIMMER

[75] Inventor: Robert G. Everts, Chandler, Ariz.
[73] Assignee: Piston Powered Products, Inc., Chandler, Ariz.
[21] Appl. No.: 405,175
[22] Filed: Aug. 4, 1982
[51] Int. Cl.[4] ............................................. B26B 29/00
[52] U.S. Cl. ...................................... 30/347; 56/12.7
[58] Field of Search .................... 30/276, 347; 56/12.7

[56] References Cited

U.S. PATENT DOCUMENTS 4,316,325  2/1982  Brucker .................................. 30/276

Primary Examiner—Jimmy C. Peters
Attorney, Agent, or Firm—Donald D. Mon

[57] ABSTRACT

A guard for a grass and weed trimmer of the line-cutting type, the guard having a body attached to a handle. A rotatable head mounted to said handle flailing the line in a plane of rotation around an axis of rotation. The body has a skirt extending partway around the axis, a cut-off blade in the path of the flailing line to cut-off excess line, and a deflector downstream from the blade to deflect the cut-off segments away from the plane of rotation, toward the ground.

2 Claims, 3 Drawing Figures

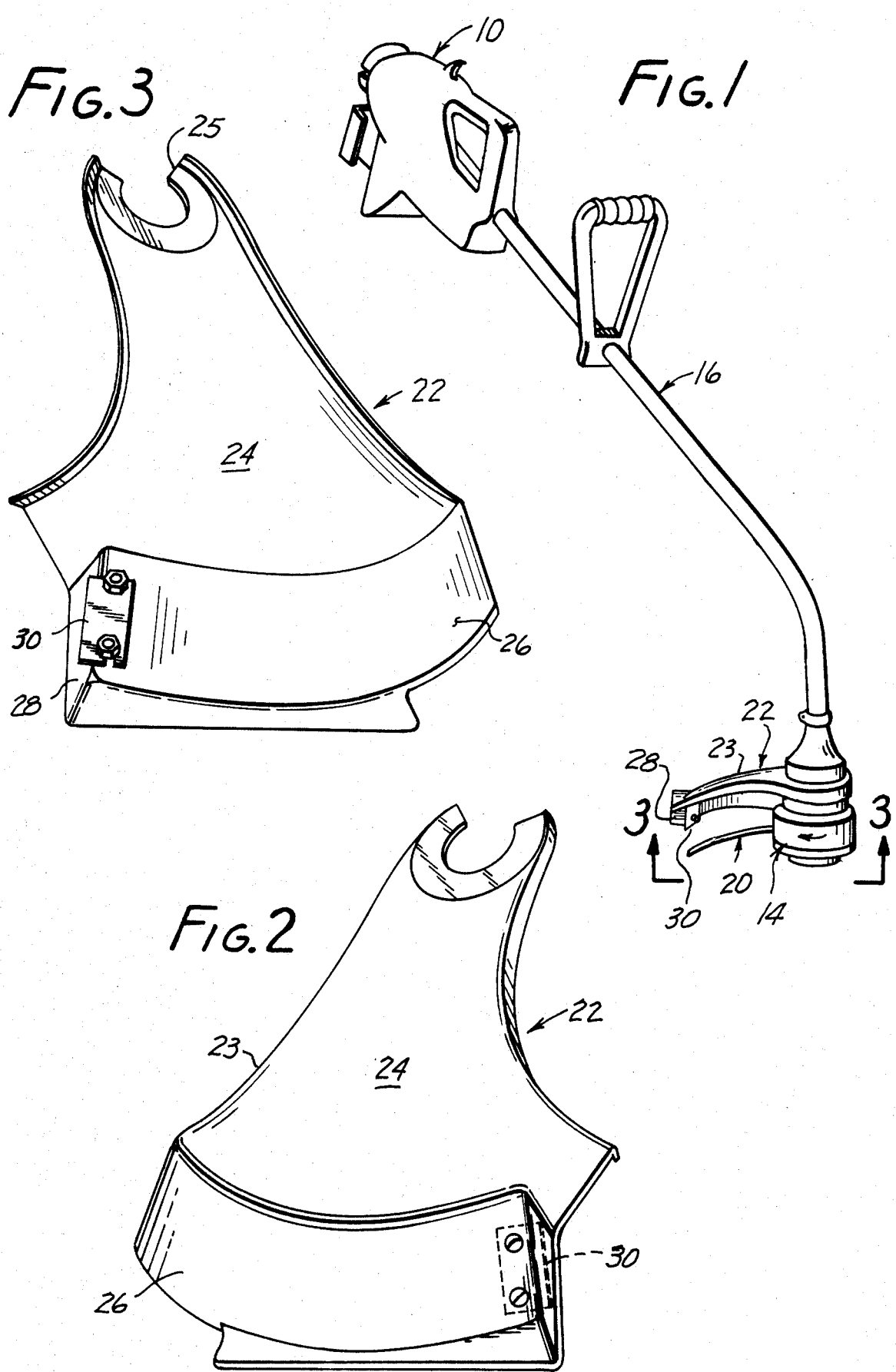

LINE GUARD FOR A LINE CUTTING TYPE WEED TRIMMER

FIELD OF THE INVENTION

This invention relates to grass and weed trimmers of the line cutting type, and more particular to a guard for the line.

BACKGROUND OF THE INVENTION

Grass and weed cutting trimmers of the line cutting type have become very popular. Their cutting technique is to flail the end of a line rapidly around an axis of rotation, and the flailing line cuts the grass or weeds. The line cutting trimmer is inherently safer than the blade type, and this accounts for much of its popularity. Blade type cutters utilize rigid blades, which if they strike the operator, can cause serious injury and even amputation of small extremities such as fingers and hands. The flailing line causes much less damage, but still it is not desirable for the operator to be struck by the flailing line, so a guard is provided.

However, in order for the trimmer to do its work, the line must project beyond the limits of the guard at some point, or the guard would protect the grass and weeds from the line. Line cutting trimmers need one function which a blade cutter does not—replenishment of the line which abrades away or breaks away in use. In the blade-type cutter, the blades are simply sharpened or replaced. The line, however, is usually made of flexible plastic or of braided wire sheathed in flexible plastic. After a period of usage an end segment of the line will have become abraded away or broken away, and it must be replaced. A conventional technique is to feed new line incrementally from a spool in the rotating head of the cutter. One such mechanism is known as the "Bump Head". When replenishment is desired, the head is bumped sharply on the ground, and an incremental length of line is issued to replace the lost segment.

A problem inherent in this technique is the uncertainty of the free length of the line. It is best and most efficient practice for this length to be appropriate to the size of the trimmer and to the speed and power of its drive. In other words, there is a best length for the line. It is known to place a very sharp blade inside the guard in the path of the flailing line to cut the line to a specific length. This does the job of cutting the line very accurately and expeditiously, but the cut-off segments are in rapid and uncontrolled motion, and can constitute a projectile which involves potential risk to the operator and the by-standers.

It is an object of this invention to provide the advantages of a line-cutting type trimmer, but without forming flying projectiles of cut-off line segments.

BRIEF DESCRIPTION OF THE INVENTION

The objectives of the invention are achieved by a line guard extending partially around the axis of rotation. It is attached to the handle at the head end and does not rotate. It extends partway around the axis of rotation, and has a downwardly extending skirt on its outer periphery and a deflector section extending outwardly and downwardly at a selected angle to the vertical. The deflector section is "downstream" from a fixed blade which cuts the line to a selected length. The trimmer has an automatic line feeder which feeds line on command. The blade precisely trims excess line. The excess segment is deflected into the ground by the deflector section on the guard. An angle of 50° to horizontal of the deflector section has been found to be optimum and most effective for the deflector section. The rapidly moving segment easily enters grass where it is trapped, and often enters the ground.

The deflector section of the guard is unique because the angle is such that trimmed pieces of line are deflected directly toward the ground.

The above and other features of the invention will be fully understood from the following detailed description and the accompanying drawings, in which:

BRIEF DESCRIPTION OF THE DRAWINGS

FIG. 1 is a perspective view of a grass and weed cutter having a line guard constructed according to the invention;

FIG. 2 is a top perspective view of the line guard illustrating its construction; and FIG. 3 is a bottom perspective of the grass and weed cutter according to the invention.

DETAILED DESCRIPTION OF THE INVENTION

A grass and weed trimmer of the line cutting type having a line guard according to the invention is shown in FIG. 1. The trimmer has a motor 10 driving a flexible drive shaft. A drive head 14 is rotatably mounted to one end of a handle 16, and the motor is mounted to the other end. The drive shaft is rotatably mounted inside the handle, and drives the head.

A rotatable spool (not shown) for containing replacement line 20 is carried inside of and rotates with the drive head 14. The spool feeds line when the bottom of the head is bumped sharply on the ground in a manner known in the art. This is done at intervals after the end of the line 20 becomes shortened by wear.

A line guard 22 is provided to protect the operator as will be discussed in greater detail hereinafter.

When additional line is fed from the spool, the excess length must be removed so that only the correct length remains. The usual method of accomplishing this task is to mount a cutting blade at a distance from the head which intercepts and cuts off a segment at the end of the line.

As was stated above, a problem with the prior art devices is that the cut-off segments of line can become projectiles which hit other objects, bystanders or the operator himself. To prevent this, line guard 22 is constructed as shown in FIGS. 2 and 3. The line guard has a body 23 that includes central segmental section 24, extending for less than the entire periphery around the axis. It preferably is made of a durable plastic material, and has a collar 25 formed on the narrow portion for attaching the line guard to the handle. The segmental section flares outwardly and terminates in a downwardly and arcuately extending skirt 26 which prevents clippings from being thrown back toward the operator.

While most line type weed trimmers have a guard with a skirt and a cut-off blade, they are not effective to protect the operator and bystanders from being hit by cut-off segments.

In this invention, the problem of safely disposing of cut-off segments is solved by the use of an angled deflector section 28 which assures that cut pieces of line will be deflected downwardly toward and even into the ground. The most effective angle for the deflecting section has been determined to be approximately 50° to the horizontal. Thus a cutting blade 30 mounted on the skirt 26 adjacent to and "upstream" from deflecting section 28 will cut-off excess material at the end of line 20, which cut piece of line will then fly to and strike deflector section 28, which will deflect it toward the ground.

The line spool is preferably a "Bump Feed" type which feeds line when the bottom side is tapped on the ground. This is done whenever the end of line 20 becomes broken or frayed. A bump of the spool on the ground will cause the mechanism to release additional line, with the excess being snipped off by contact of the flailing line against the sharp edge of blade 30. Such feeding mechanism is known in the art and forms no part of this invention. Forming the deflector section at approximately 50° to the horizontal (i.e. the ground) when the line is rotating in a horizontal plane has been found to be very effective for deflecting cut pieces of line, clippings, or objects toward the ground.

This invention is not to be limited by the embodiment shown in the drawings and described in the description, which is given by way of example and not of limitation, but only in accordance with the scope of the appended claims.

I claim:

1. A guard for cutting to length and disposing of cut-off segments of line issued from a spool carried by a rotating head which head has an axis of rotation and flails the line around said axis in a plane said head being mounted to a handle, said guard comprising: a body attachable to said handle having a skirt extending at least partway around said axis, a blade attached to said body in the path of said flailing line at a predetermined distance from said axis so as to cut-off segments of line which extend in excess of the said distance from said axis, and a deflector section on said body adjacent to and downstream from said blade, extending across the tangential path of the free end segment of said line cut off by the blade, acting as a barrier to its flight, and so disposed and arranged before said skirt so as to intersect and deflect said cut-off segment downwardly away from the plane of rotation of said flailing line.

2. Apparatus according to claim 1 in which said deflector section is disposed at an angle of approximately 50° to the plane of rotation of said flailing line.

* * * * *